United States Patent
Abeyweera

(10) Patent No.: US 9,461,977 B2
(45) Date of Patent: Oct. 4, 2016

(54) METHOD, SYSTEM AND APPARATUS FOR A COMMUNICATIONS CLIENT PROGRAM AND AN ASSOCIATED TRANSFER SERVER FOR ONYMOUS AND SECURE COMMUNICATIONS

(76) Inventor: Ranganath C. Abeyweera, Preston (AU)

( * ) Notice: Subject to any disclaimer, the term of this patent is extended or adjusted under 35 U.S.C. 154(b) by 0 days.

(21) Appl. No.: 13/983,790

(22) PCT Filed: Sep. 30, 2011

(86) PCT No.: PCT/AU2011/001254
§ 371 (c)(1),
(2), (4) Date: Aug. 6, 2013

(87) PCT Pub. No.: WO2013/044284
PCT Pub. Date: Apr. 4, 2013

(65) Prior Publication Data
US 2013/0312065 A1   Nov. 21, 2013

(51) Int. Cl.
*H04L 29/06* (2006.01)
*H04L 12/58* (2006.01)

(52) U.S. Cl.
CPC .............. *H04L 63/08* (2013.01); *H04L 51/12* (2013.01); *H04L 63/0464* (2013.01); *H04L 63/0876* (2013.01); *H04L 63/126* (2013.01); *H04L 51/28* (2013.01); *H04L 63/18* (2013.01)

(58) Field of Classification Search
CPC . H04L 63/08; H04L 63/0464; H04L 63/126; H04L 51/12; H04L 51/28; H04L 63/0876; H04L 63/18
See application file for complete search history.

(56) References Cited

U.S. PATENT DOCUMENTS

| | | | |
|---|---|---|---|
| 2003/0081785 A1* | 5/2003 | Boneh et al. | 380/277 |
| 2005/0201527 A1* | 9/2005 | Meer et al. | 379/45 |
| 2005/0259658 A1* | 11/2005 | Logan | H04L 67/306 370/392 |
| 2007/0104323 A1* | 5/2007 | Hammell et al. | 380/30 |
| 2007/0203844 A1 | 8/2007 | Kuhn et al. | |
| 2008/0104191 A1* | 5/2008 | Agrawal | G07B 17/00024 709/207 |
| 2008/0313457 A1 | 12/2008 | Ilechko | |
| 2010/0145871 A1 | 6/2010 | Kesem et al. | |
| 2011/0004653 A1 | 1/2011 | Cavill et al. | |
| 2011/0138175 A1* | 6/2011 | Clark et al. | 713/168 |

(Continued)

FOREIGN PATENT DOCUMENTS

| DE | 102007043765 A1 | 3/2009 |
|---|---|---|
| WO | WO2009015068 A1 | 1/2009 |

OTHER PUBLICATIONS

Authorized officer Andrew Munro, International Search Report in PCT/AU2011/001254 mailed Mar. 1, 2012, 6 pages.

(Continued)

*Primary Examiner* — Michael Pyzocha
(74) *Attorney, Agent, or Firm* — Fish & Richardson P.C.

(57) ABSTRACT

The present invention provides a communications client program and an associated transfer server for onymous and secure communications over the internet. The communications client program is used for electronically sending and receiving mail items and for conducting realtime audio and video communications in a secure manner. A mail item is any item of correspondence that bears an addressee's street address (i.e. number, street, suburb, state and post code) or an advertising item that does not necessarily bear an addressee, but includes nominations for preferred destinations.

12 Claims, 11 Drawing Sheets

(56) References Cited

U.S. PATENT DOCUMENTS

2011/0145273 A1* 6/2011 Kolathaya et al. ........... 707/769
2012/0110345 A1* 5/2012 Pigeon et al. ................ 713/189
2013/0117400 A1* 5/2013 An et al. ...................... 709/206

OTHER PUBLICATIONS

"Skype", [online] [Retrievied on Dec. 13, 2011]; Retrieved from the Internet <URL: http://en.wikipedia.org/wiki/index/php?title=Skype&oldid=453056708>; published Sep. 29, 2011, 14 pages.

"SSH File Transfer Protocol" [online] [Retrieved on Dec. 13, 2011]; Retrieved from the Internet <URL: http://en.wikipedia.org/wiki/index/php?title=SSH_File_Transfer_Protocol&oldid=451698740>; published Sep. 21, 2011; 5 pages.

"Zumbox" [online] [Retrieved on Dec. 13, 2011]; Retrieved from the Internet <URL: http://web.archive.org/web/20110209205546/www.zumbox.com/>; published on Feb. 9, 2011; 1 page.

"Skype Protocol" [online] [Retrieved on Dec. 13, 2011]; Retrieved from the Internet <URL: http://en.wikipedia.org/wiki/index/php?title=Skype&oldid=453060737>; published on Sep. 29, 2011; 4 pages.

Extended European Search Report for European Application No. 11872933.4, issued May 20, 2015.

* cited by examiner

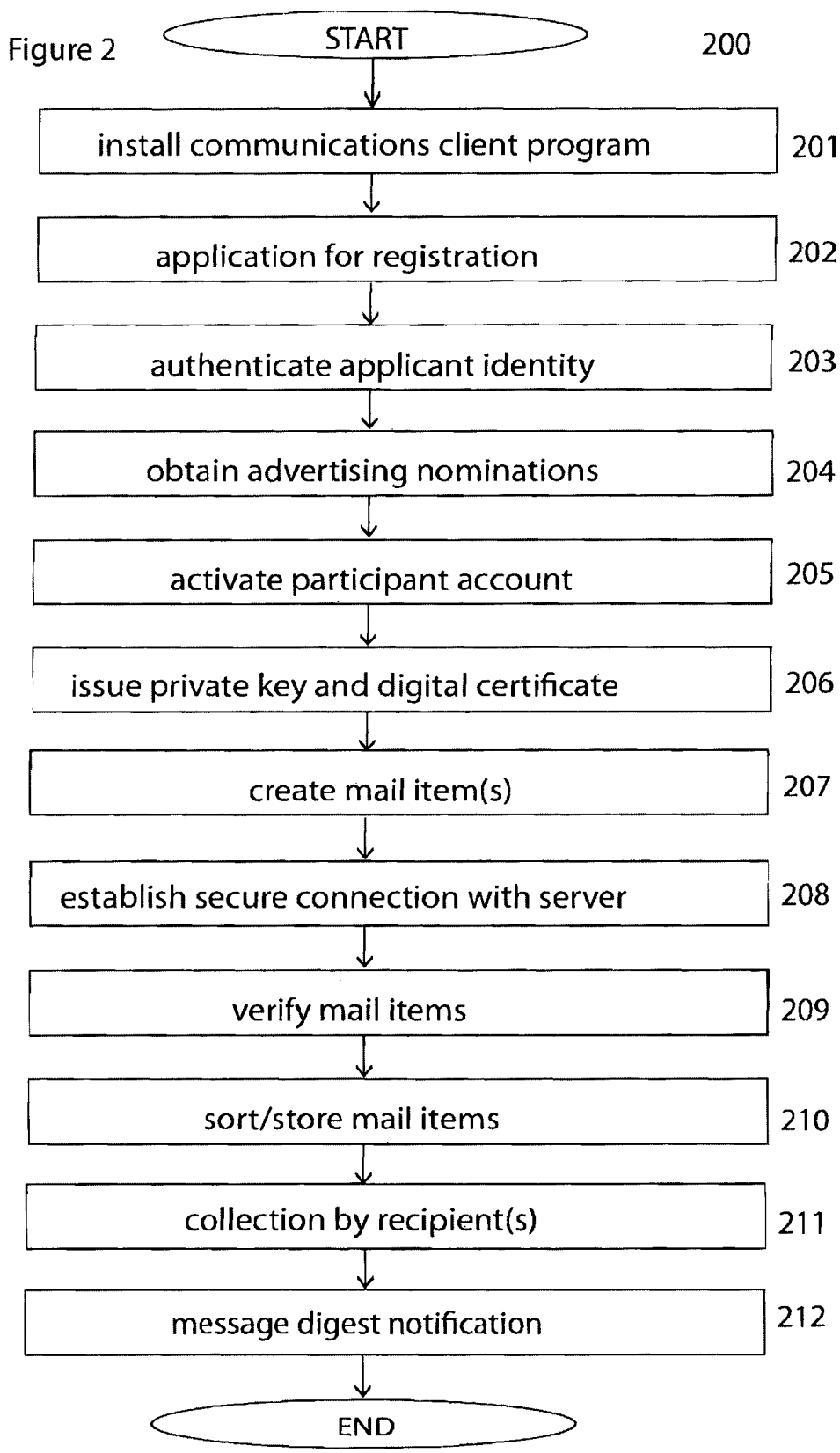

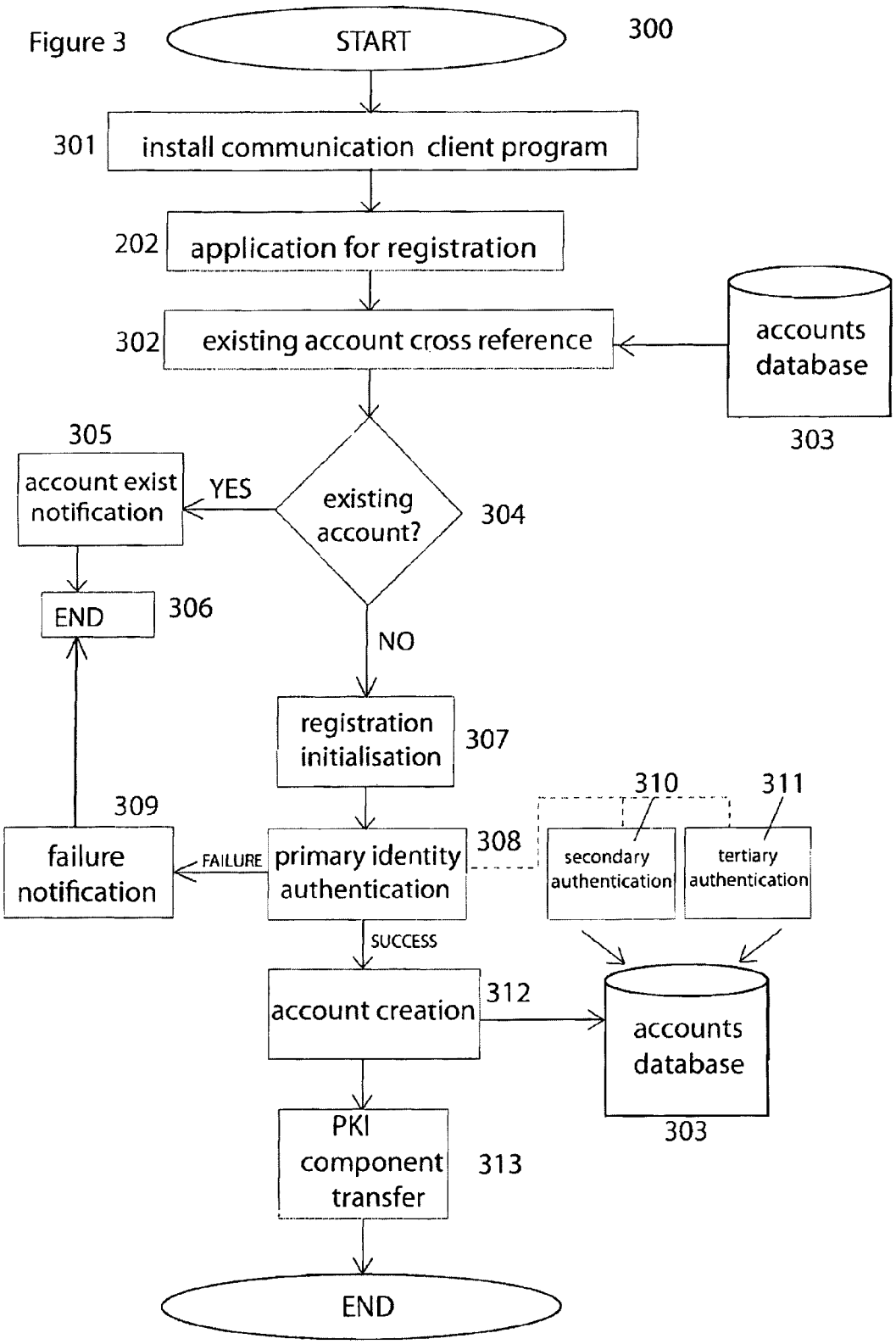

US 9,461,977 B2

METHOD, SYSTEM AND APPARATUS FOR A COMMUNICATIONS CLIENT PROGRAM AND AN ASSOCIATED TRANSFER SERVER FOR ONYMOUS AND SECURE COMMUNICATIONS

FIELD OF INVENTION

The present invention relates to a method, system and apparatus involving a communications client program for electronically sending and receiving mail items and/or for conducting real-time audio and video communications in a secure manner. The present invention also relates to a corresponding transfer server which facilitate the said communications. A mail item may be any item of correspondence that bears an addressee's street address (i.e. number, street, suburb, state and post code) or an advertising item that does not necessarily bear an addressee, but includes nominations for preferred destinations.

BACKGROUND OF THE INVENTION

The conventional postal system delivers street addressed mail items and "junk mail" advertising materials. Senders of mail items are not verified and receiver verification is inbuilt in that receivers of said mail items have to reside in the address to access the sent mail items. The only prerequisite the mail sender has to have is access to the addressee's postal address. This current mail system is in need of an electronic alternative to lift productivity levels, increase competition and add services that can only be delivered through an electronic platform.

At present, the existing electronic alternatives, email and web spaces for mail storage (e.g. bank statements) has not provided a comprehensive solution, partly due to the essentially unauthenticated nature of email correspondence and the inconvenience of the latter. Forging an email address is trivial and therefore the integrity of the entire email system can be compromised. Identity authentication via digital certificates and secure transmission through encryption is available as an add-on service for email services which only partially solves the problem of secure and authenticated communications. Public key infrastructure (PKI) design requires that every email account holder has public keys corresponding to every other email account holder that they may like to communicate with, which severely limits the scalability of the authenticated email service as a public alternative.

At the heart of internet communications lies a problem of authentication. The internet protocol (IP) addressing scheme does not include a default user authentication mechanism prior to accessing the internet. Web browsers access the internet using static and dynamic IP addresses. However, various organisations have adopted the PKI and use digital certificates signed by third party certificate authorities (CA) to identify themselves to users on the internet. Financial institutions use a digital certificate to confirm their identity to customers. What ensues is a one-way authenticated secure channel of communication. Authenticity and security are essential aspects that encourage participation in various activities including economic activities via the internet. So far most individuals who access the internet for communication purposes do not have an authenticated digital certificate that attest to individual or entity identity.

Unsolicited "junk mail" which fills conventional mailboxes has a location specificity. For example, the "pizza restaurant specials leaflet" from the local pizza restaurant get sent to nearby street addresses. "Junk mail" is from organisations and businesses that hope to attract attention from a target market selected largely by geographic locality. At present, recipients of such mail items do not have an opportunity to pre-select areas of interests and the lack of correlation between advertisers intent and a customers interest result in an enormous waste of energy and resources.

A comprehensive alternative approach for electronic delivery of location specific advertising items does not exist. Furthermore recipients of advertising mail items in existing platforms do not have a means of specifying their preferences. For example, recipients cannot specify that they may be interested in advertising material regarding local retail sales but not necessarily interested in local supermarket promotions.

Voice and video communications over the internet such as services provided by "Skype" lacks user authentication prior to engagement. Apart from users who are part of a private network or a virtual private network, user authenticated secure channel for audio and video communications do not exist in the public domain.

Accordingly, there is a need for a method and system for providing a secure and user identity authenticated communications service to overcome aforementioned problems and limitations. It is desirable to provide an integrated communications system where all participants are authenticated prior to engagement. Furthermore, it is desirable that the default addressing scheme be the street address scheme used by the postal services, which allows existing mail senders to use the electronic system using the information they already have. The use of street addresses also facilitate the required separation from existing email systems. It is also desirable for participants to be able to nominate areas of advertising interests or a lack thereof, enhancing the ability of advertisers to target advertising material with the establishment of a correlation between customer interest and advertiser intent.

SUMMARY OF THE INVENTION

In a first aspect, the present invention provides a method of registering a user for secure communications, the method comprising the steps of:

a server receiving application data from a user device, the application data including a name of the user and a corresponding postal address of the user, and a user device identification key generated by the user device based on an identifier of the user device;

the server outputting an activation key based on the user device identification key, for posting to the user in a postal mail item bearing the name of the user and the corresponding postal address of the user received by the server;

the user device receiving an input comprising the activation key;

the user device transmitting the activation key to the server; and the server registering the user for secure communications, by storing in a database the name of the user and the corresponding postal address of the user in response to receipt of the activation key.

In a second aspect, the present invention provides a method of transmitting content of a postal mail item from a first user to a second user, the method comprising the steps of:

a first user device establishing a secure channel of communication with a server in communication with a database storing a plurality of names and postal addresses, each name and postal address associated with an activation key and a postal mail folder, the secure channel of communication established by:

(i) the first user device generating a first user device identification key based on an identifier of the first user device;

(ii) the first user device transmitting to the server an activation key based on the first user device identification key, the activation key corresponding to the activation key associated with one of the names and postal addresses stored in the database; and (iii) the server receiving the activation key transmitted from the first user device;

the first user device generating an electronic copy of content of a postal mail item bearing the name and postal address of the second user;

the first user device transmitting the electronic copy to the server via the secure channel of communication;

the server locating from the plurality of names and postal addresses stored in the database a name and postal address corresponding to the name and postal address of the second user transmitted from the first user device; and the server storing the electronic copy in the postal mail folder associated with the located name and postal address, for collection by the second user.

In a third aspect, the present invention provides a method of transmitting content of an advertising mail item from a first user to one or more second users, the method comprising the steps of:

a first user device establishing a secure channel of communication with a server in communication with a database storing a plurality of names and postal addresses, each name and postal address associated with an activation key, interests information and an advertising mail folder, the secure channel of communication established by:

(i) the first user device generating a first user device identification key based on an identifier of the first user device;

(ii) the first user device transmitting to the server an activation key based on the first user device identification key, the activation key corresponding to the activation key associated with one of the names and postal addresses stored in the database; and (iii) the server receiving the activation key from the first user device;

the first user device generating an electronic copy of the content of the advertising mail item;

the first user device receiving interests information related to the electronic copy;

the first user device transmitting the electronic copy and the interests information related to the advertising mail item to the server via the secure channel of communication;

the server locating from the plurality of names and postal addresses stored in the database one or more second user names and postal addresses based on the interests information transmitted from the first user device, by comparing the interests information respectively associated with the plurality of names and postal addresses stored in the database to the interests information transmitted from the first user device;

the server storing an electronic copy of the content of the advertising mail item transmitted from the first user device in each one of the one or more advertising mail folders respectively associated with the located names and postal addresses, for collection by the one or more second users.

In a fourth aspect, the present invention provides a method of enabling audio or video communication between a first user and a second user, the method comprising the steps of:

a first user device establishing a secure channel of communication with a server in communication with a database storing a plurality of names and postal addresses, each name and postal address associated with an activation key and an Internet Protocol (IP) address, the secure channel of communication established by:

(i) the first user device generating a first user device identification key based on an identifier of the first user device;

(ii) the first user device transmitting to the server an activation key based on the first user device identification key, the activation key corresponding to the activation key associated with one of the names and postal addresses stored in the database; and (iii) the server receiving the activation key from the first user device;

the first user device transmitting to the server a request for a communication channel with the second user, the request comprising the name and address of the second user;

the server locating from the plurality of names and postal addresses stored in the database a name and postal address corresponding to the name and postal address of the second user transmitted from the first user device; and the server enabling audio or video communication between the first user and the second user, by transmitting to the first user device the IP address associated with the located name and postal address.

In a fifth aspect, the present invention provides a method of registering a user for secure communications, the method comprising the steps of:

receiving a name of the user and a corresponding postal address of the user;

generating a user device identification key based on an identifier of a user device;

generating application data including the name of the user and the corresponding postal address of the user and the user device identification key;

transmitting the application data to a server;

receiving an input comprising an activation key based on the user device identification key, the activation key posted to the user in a postal mail item bearing the name of the user and the corresponding postal address of the user included in the application data transmitted to the server; and transmitting the activation key to the server.

In a sixth aspect, the present invention provides a method of transmitting content of a postal mail item from a first user to a second user, the method comprising the steps of:

establishing a secure channel of communication with a server in communication with a database storing a plurality of names and postal addresses, each name and postal address associated with an activation key and a postal mail folder, the secure channel of communication established by:

(i) generating a first user device identification key based on an identifier of a first user device; and (ii) transmitting to the server an activation key based on the first user device identification key, the activation key corresponding to the activation key associated with one of the names and postal addresses stored in the database;

generating an electronic copy of the content of the postal mail item bearing the name and postal address of the second user; and transmitting the electronic copy to the server via the secure channel of communication, for storage in the postal mail folder associated with the name and postal address of the second user.

In a seventh aspect, the present invention provides a method of transmitting content of an advertising mail item from a first user to one or more second users, the method comprising the steps of:

establishing a secure channel of communication with a server in communication with a database storing a plurality of names and postal addresses, each name and postal address associated with an activation key, interests information and an advertising mail folder, the secure channel of communication established by:
 (i) generating a first user device identification key based on an identifier of a first user device; and
 (ii) transmitting an activation key based on the first user device identification key to the server, the activation key corresponding to the activation key associated with one of the names and postal addresses stored in the database;

generating an electronic copy of the content of the advertising mail item;

receiving interests information related to the electronic copy; and transmitting the electronic copy and the interests information to the server via the secure channel of communication, for storage in the one or more advertising mail folders respectively associated with one or more names and postal addresses located from the names and postal addresses stored in the database based on the interests information.

In an eighth aspect, the present invention provides a method of enabling audio or video communication between a first user and a second user, the method comprising the steps of:

establishing a secure channel of communication with a server in communication with a database storing a plurality of names and postal addresses, each name and postal address associated with an activation key, the secure channel of communication established by:
 (i) generating a first user device identification key based on an identifier of a first user device; and
 (ii) transmitting an activation key based on the first user device identification key to the server, the activation key corresponding to the activation key associated with one of the names and postal addresses stored in the database;

generating a request for a communication channel with the second user, the request comprising the name and address of the second user; and transmitting the request to the server via the secure channel of communication, for enabling audio or video communication between the first user and the second user.

In a ninth aspect, the present invention provides a method of registering a user for secure communications, the method comprising the step of:

receiving application data from a user device, the application data including a name of the user and a corresponding postal address of the user, and a user device identification key generated by the user device based on an identifier of the user device;

outputting an activation key based on the user device identification key received from the user device, for posting to the user in a postal mail item bearing the name of the user and the corresponding postal address of the user;

receiving from the user device an input comprising the activation key; and registering the user for secure communications, by storing in a database the name of the user and the corresponding postal address of the user in response to receipt of the activation key.

In a tenth aspect, the present invention provides a method of transmitting content of a postal mail item from a first user to a second user using a database storing a plurality of a plurality of names and postal addresses, each name and postal address associated with an activation key and a postal mail folder, the method comprising the step of:

establishing a secure channel of communication with a first user device by receiving from the first user device an activation key (i) generated by the first user device based on an identifier of the first user device, and (ii) corresponding to an activation key associated with one of the plurality of names and postal addresses stored in a database;

receiving an electronic copy of the content of the postal mail item bearing the name and postal address of the second user from the first user device via the secure channel of communication; locating from the plurality of names and postal addresses stored in the database a name and postal address corresponding to the name and postal address of the second user received from the first user device; and storing the electronic copy in the postal mail folder associated with the located name and postal address, for collection by the second user.

In an eleventh aspect, the present invention provides a method of transmitting content of an advertising mail item from a first user to one or more second user using a database storing a plurality of a plurality of names and postal addresses, each name and postal address associated with an activation key, interests information and an advertising mail folder, the method comprising the step of:

establishing a secure channel of communication with a first user device by receiving from the first user device an activation key (i) generated by the first user device based on an identifier of the first user device, and (ii) corresponding to an activation key associated with one of the plurality of names and postal addresses stored in the database;

receiving from the first user device via the secure channel of communication an electronic copy of the content of the advertising mail item and interests information related to the advertising mail item;

locating one or more names and postal addresses from the plurality of names and postal addresses stored in the database based on the interests information transmitted from the first user device, by comparing the interests information respectively associated with the plurality of names and postal addresses stored in the database to the interests information received from the first user device;

storing an electronic copy of the content of the advertising mail item received from the first user device in each one of the one or more advertising mail folders respectively associated with the located names and postal addresses, for collection by the one or more second users.

In a twelfth aspect, the present invention provides a method of enabling audio or video communication between a first user and a second user using a database storing a plurality of a plurality of names and postal addresses, each name and postal address associated with an activation key and an Internet Protocol (IP) address, the method comprising the step of:

establishing a secure channel of communication with a first user device by receiving from the first user device an activation key (i) generated by the first user device based on an identifier of the first user device, and (ii) corresponding to an activation key associated with one of the plurality of names and postal addresses stored in the database;

receiving from the first user device via the secure channel of communication a request for a communication channel with the second user, the request comprising the name and postal address of the second user;

locating from the plurality of names and postal addresses stored in the database a name and postal address corresponding to the name and postal address of the second user received from the first user device; and transmitting to the first user device the IP address associated with the located name and postal address.

The present invention also provides a system, method and apparatus for a user identity authenticated communications client program for secure and onymous electronic communications and a corresponding transfer server which facilitate the said communications. In the event that the communication is by mail, the method includes the steps of:

providing a communications client program to authenticated participants to send and receive mail items;

providing a transfer server having an associated database containing participants details;

authenticated participant sender establishing a secure channel of communication with the transfer server;

authenticated participant sender sending an encrypted item of mail to an addressee bearing street address or in the case of an advertisement, target audience preferences;

the transfer server receiving the mail item;

the transfer server verifying the intended recipient is a participant;

the transfer server decrypting the message and encrypting the said message with recipient public key;

the transfer server storing the mail item in the recipient(s) mail folder for collection by the said recipient;

the authenticated participant recipient establishing a secure channel of communication with the transfer server;

the transfer server delivering the mail item to the recipients communications client program in electronic form;

the recipient communications client sending a message digest notification to the transfer server if required;

the recipient decrypting the mail item, and in the event that the communication is either audio or video, the method includes the steps of:

providing a communication client program to authenticated participants for audio and video communications;

providing a transfer server containing participant details;

authenticated participant initiator establishing a secure channel of communication with the transfer server;

authenticated participant initiator requesting a communication channel with an addressee from the transfer server;

the transfer server discovering whether the addressee is a participant and if indeed a participant whether the addressee is available for communications;

upon success, providing the initiator with the addressees IP address;

the initiator communications client program establishing a secure channel of communications with the addressee communications client program;

upon successful communication, terminating the established connection.

The invention provides a technical solution that parallels in many respects the conventional postal service albeit the solution is an electronic one. It uses the postal service street addressing scheme, which every individual and legal entity has an association with, as opposed to a system specific identifier or conventional email address. The method and system overcomes the postal services weaknesses by providing an advertising platform that accounts for customer interest or a lack thereof. Use of the conventional street addressing scheme also means that any user who participates in the system can send sender authenticated secure mail items to anyone who participates in the system, provided they know the receivers street address. Location specific messages and advertising messages can be sent by anyone on the system and the correlation between advertiser intent and customer interest is resolved at the transfer server. The method and system extends conventional postal services by providing audio and video channels for secure and authenticated communications.

Furthermore, the invention can significantly improve on the conventional email system. All participant identities are verified prior to engagement and mail items are encrypted preventing non-intended recipients from access. Default message digest notifications provide added certainty and security to the transferred mail items within the system. Integrity of the onymous communication system is robust in comparison with conventional email systems and thus provide a suitable digital alternative for secure communications in the public domain, which as of yet does not exist.

Conventional postal operators mail boxes receive unsolicited mail items mainly from local entities. There is no method to correlate a mail box owners particular preferences in an area of advertising with an advertisers intent of attracting a potential customer. "Spam" mail on email systems have become the digital equivalent of "junk mail" and clutter email in-boxes. The invention improves significantly on existing practices by firstly eliciting participant preferences in the form of nominations of areas of interest and then by providing the opportunity for advertisers to simply send advertisements to the transfer server with target market descriptions and the transfer server matching participants nominations and forwarding mail items only to interested participants. In this respect participants have an added control in soliciting potentially interesting information and blocking unwanted material.

Furthermore, the mail sending process is streamlined with electronic sending of mail items and thus mitigates the inconveniences of having to print, envelope, stamp and take the mail item to a collection location, significantly improving productivity and reducing carbon footprint.

In accordance with an embodiment of the invention, the identity of participants is established and verified prior to participation. The method preferably includes a primary authentication process, which includes the steps of:

the potential participant installing a communications client program on a PC or a suitable hand-held device e.g. PDA;

the transfer server receiving a participation application from the potential participant via the communications client program;

the participant request including participant information enabling the identity of the participant to be validated;

validating the identity of the participant using the participant information;

if validation is successful, accepting the participant request, creating a corresponding participant entry in the database, issuing a signed certificate and corresponding private key to the participant or otherwise rejecting the potential participant request.

The primary authentication process is carried out by sending an "activation key" to the participant via conventional post services. This method confirms that the participant has access to the physical postal address and by association confirms the name address correlation. Secondary method of authentication includes the participant sending copies of original identity documents e.g. passport, drivers licence or utility bills via the communications client program to the transfer server and manual or automated audit of the said documents at the transfer server. A tertiary method of authentication includes participant presenting original identity documents. e.g. passport, drivers licence or utility bills to be verified, photocopied and sent to the transfer server at a nominated physical outlet (e.g. the local post office) by an attendee. Other methods of identity verification which are known to a person skilled in the relevant art may additionally be used.

Subsequently, once the initial identity validation is successful, in accordance with the invention, the participant is issued with a private key and a corresponding CA signed digital certificate to persist the validity of identification. The transfer server acts as the certificate authority by issuing, signing and managing the associated public key infrastructure. The authentication mechanism goes further than a common digital certificate assignment. The three levels of authentication introduces extended levels of authentication reliability associated with the issued digital certificate in conjunction with the authentication levels recorded at the transfer server. Additional authentication is guaranteed by having the devise specific "activation key" presented with each connection to the transfer server. Even if the digital certificate is compromised, access to the transfer server is not granted unless the appropriate "activation key is presented. Additional functions carried out by the transfer server as the Certificate Authority is apparent to those skilled in the relevant art.

In an embodiment, the invention is advantageously able to substantially eliminate issues relating to security and identity in electronic mail transfer systems in the public domain. The invention provides an improved ability for individuals and entities to communicate over the internet onymously (identity verified). Law enforcement agencies and other governmental organisations may be able to communicate with the general public over the internet legally using the invention. A further outcome of onymous communications is the ability to integrate existing real-time communication methods including audio and video with the benefits of onyminity.

Increased uptake of the invention is anticipated to reduce paper-based mail communications, which will result in reduced levels of resource consumption, increased productivity, increased local correspondences (location specific) and social, economic and environmental benefits that flow as a consequence.

Government and non government organisations will have the ability to integrate location specific communications once the invention has a high level of participation. Early warning systems (e.g. flood and bush fire alerts) which essentially operate with a location specificity can integrate the invention to communicate with the intended audience effectively. Medical epidemic situations can be monitored more effectively by geographic region and vital information exchanged through the services provided the invention.

It is preferred that the method be internet-based i.e. that the transfer server is provided having an internet connection such that participant activities can be executed via the internet. It is also preferred that the participant communication client program is provided having an internet connection to communicate with the transfer server.

In accordance with a preferred embodiment of the invention, access to and from the transfer server for participants is provided via a stand-alone or an integrated communications client program installed by the participant. Participants cannot use any available web browser to access the transfer server. Participants can only use the communication client program installed in their respective device(s). Participants may install the communication client program on one or more devices that they wish to use as a gateway to the transfer server. For example, a participant may wish to install the communication client program on a PC and/or a hand-held device e.g. PDA. Both instances of the communication client program has to be registered with the transfer server prior to use. Once the identity validation of the participant is carried out successfully using the "activation key" which is delivered by conventional postal service to the participant, the specific instance of the communication client program is activated. The "activation key" is generated by the communication client program using a hardware specific identifier (e.g. MAC address in PCs, IMEI number in mobile devices) so as to prevent unauthorised use of the communication client program. Communication client program maybe stand alone or integrated with existing email client programs such as Microsoft Exchange or Apple Mail. The anticipated advantage of using a nominated point(s) of entry to the transfer server is that all participants are able to send and receive mail items securely without compromising the integrity of the system. A further anticipated advantage is the sense of security the participants feel having their important documents delivered to device(s) nominated by the said participant. The communication client program may act as a vault for documents. Participants may wish to store external documents in a folder on the mail client program which then may be synchronised with a web storage space on the transfer server.

Access to the transfer server is initiated by participants both when receiving and sending mail items and message digest notifications, which is analogous to standard email client programs implementing POP or IMAP protocols. However when required, as is in the case when the transfer server queries a participant for audio/video communications availability, the transfer server may initiate contact with the participant. Firewalls and access control methods are implemented at the transfer server to restrict unauthorised access and to identify participants accessing the system. A "client-authenticated TLS and SSL handshake" may be initiated at participant login request.

Access to the transfer server is provided through the installed communications client program and therefore correspondence is available from anywhere in the world as long as the participant has a registered device and an internet connection.

The present invention also provides a transfer server for the transfer of mail items to corresponding recipient(s) and for establishing a audio or video communication channel. The transfer server including:

at least one processor;

a database containing participant details including name and street address;

a database containing participant public key;

a database containing advertising category preference nominations;

at least one data communications interface operatively coupled to the processor;

at least one storage medium operatively coupled to the processor, the storage medium containing program instructions to execute the steps of:

facilitating potential participant registration and activation process;

facilitating the authenticated participant sender establish a secure channel of communication with the transfer server via the installed communications client program;

the transfer server receiving an item of mail sent by the participant mail sender;

the transfer server verifying the intended recipient is a participant;

the transfer server decrypting the message and encrypting the sent message with recipient public key;

the transfer server storing the mail item in the recipients secure mail folder for collection by the said recipient;

facilitating the authenticated participant recipient establish a secure channel of communication with the transfer server;

the transfer server delivering the mail item to the recipients communication client program in electronic form;

the recipient communication client sending a message digest notification to the transfer server;

the transfer server storing the message digest notification in the message senders mail folder for collection, and in the event a mail item is either an item of advertising or information:

facilitating authenticated participant sender establish a secure channel of communication with the transfer server;

the transfer server establishing a single participant or a group of participants who have subscribed to the category that the mail item belongs to and are within the locality that the sender of the said mail item has nominated;

if the mail item is encrypted, decrypt the mail item and encrypt the mail item with the intended recipient(s) public key;

the delivery server storing the mail item in the recipient(s) message folder(s);

the recipient(s) establishing a secure communication channel with the transfer server;

the transfer server delivering the mail item to the recipient(s) communication client program, and furthermore if the communication request is for an audio/video channel:

authenticated participant initiator establishing a secure channel of communication with the transfer server;

authenticated participant initiator requesting a communication channel with an addressee from the transfer server;

the transfer server discovering whether the addressee is a participant and if indeed a participant whether the addressee is available for communications;

upon success, providing the initiator with the addressees IP address;

the initiator communications client program establishing a secure channel of communications with the addressee communications client program;

upon successful communication, terminating the established connection.

In another aspect, the present invention provides a transfer server with accordance with the invention, including:

means for establishing a secure channel of communication with participants communication client programs;

means for transferring mail items via the said communication channel;

means for facilitating an audio/video communication channel.

The transfer server preferably contains further programming instructions to execute the various functions of a certificate authority including key and certificate generation, certificate signing, certificate exchange management functions and other "CA" functions apparent to a person skilled in the relevant art.

It is to be understood that the method is extensible to a large number of participants, accordingly the transfer server and the underlying infrastructure is extensible as apparent to persons skilled in the relevant art.

The present invention also provides a communication client program for participants to send and receive mail items and establish audio/video communication channel. The communication client program includes;

program instructions to execute the steps of:

the participant applying for registration and activation;

the authenticated participant sender sending mail items securely;

the authenticated participant receiving mail items securely;

the authenticated participant decrypting and storing mail items.

and in the event the communication is either audio or video:

the authenticated participant requesting an audio/video communication channel;

the authenticated participant establishing and using an audio/video communication channel with the addressee participant.

According to the invention, the communication client program will comprise necessary means to execute the said operations. Instruction sets and device components that are apparent to persons skilled in the relevant art will additionally be used.

The transfer server and the communication client program is preferably computer-implemented and the means for effecting functionality include suitable interface hardware at the server for interfacing to a communications network such as the internet and may further include one or more software components executed by at least one processor of the server computer including instructions to effect corresponding functionality.

Further preferred features and advantages of the invention will be apparent to those skilled in the relevant art from the following description of preferred embodiments of the invention, which should not be considered to be limiting of the scope of the invention as detailed in the preceding statements or in the claims appended hereto.

BRIEF DESCRIPTION OF THE DRAWINGS

The features of the invention will now be described referring to the accompanying drawings, wherein like reference numbers refer to like features, and in which:

FIG. 2 is a flowchart illustrating steps in a method for electronically transferring mail items according to a preferred embodiment of the invention;

FIG. 3 is a flowchart of an exemplary application and account creation process according to a preferred embodiment of the invention.

DETAILED DESCRIPTION OF PREFERRED EMBODIMENTS

Figure 1A:
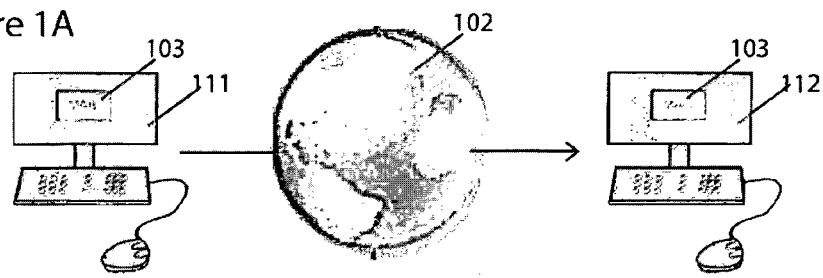
FIG. 1A is a schematic diagram of a system electronically transferring an addressed mail item in accordance with a preferred embodiment of the invention.
Figure 1B:
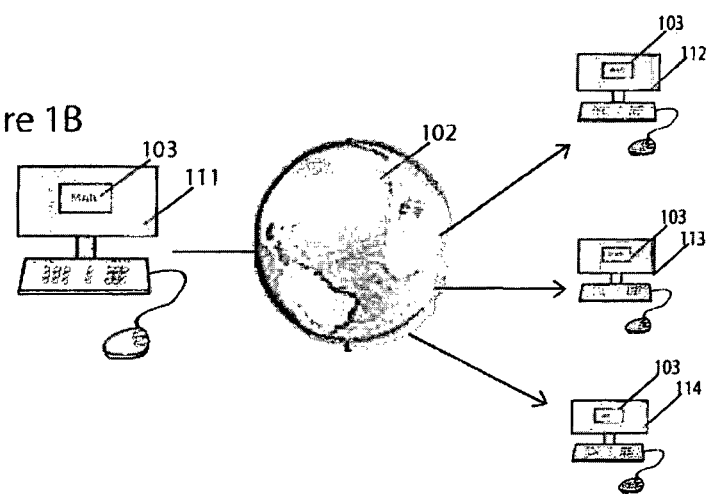
FIG. 1B is a schematic diagram of a system electronically transferring an advertisement item to multiple recipients in accordance with a preferred embodiment of the invention.
Figure 1C:
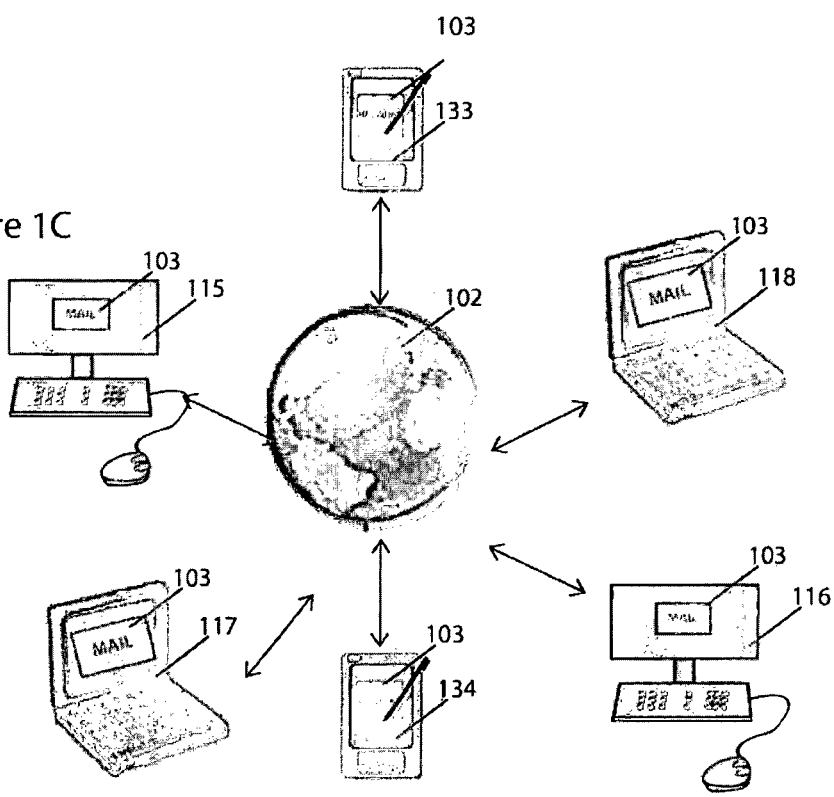
FIG. 1C is a schematic diagram of a system with multiple participants.
Figure 1D:
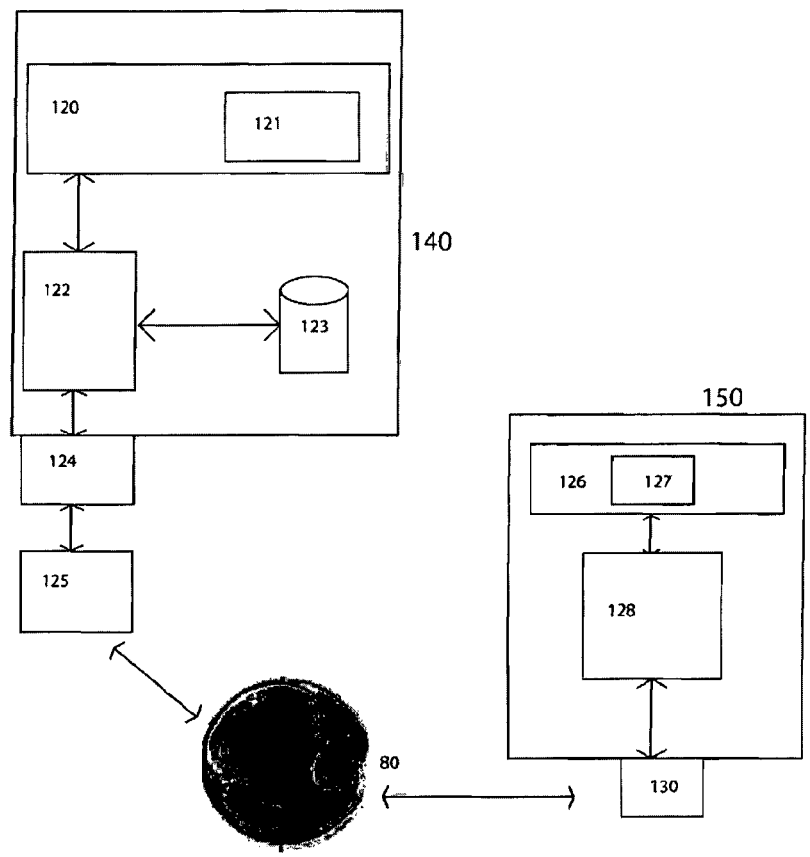
FIG. 1D is a block diagram illustrating a transfer server and communication client program in an internet-based implementation of the system in FIG. 1A and FIG. 1B.

According to a preferred embodiment of the present invention, here are provided methods and apparatus for providing a communications client program and an associated transfer server for onymous and secure communications. FIG. 1A, FIG. 1B and FIG. 1C show schematic diagram of an exemplary system 100 for the transfer of mail items in accordance with the invention. FIG. 1D show an internet implementation of a preferred embodiment of the system 100 through an exemplary block diagram illustrating specific component arrangements.

The system 100 includes a transfer server 102 which in a preferred embodiment is a computer or computer system with one or more central processing units 122, operatively coupled with a database 123. The database 123 includes participant details and mail items as described in detail below. The transfer server 102 further includes at least one storage medium 120 with instruction code 121, to be executed by the processor 122.

The transfer server additionally includes one or more network interfaces 124 to facilitate connection to the internet 80. The network interface 124 may be any suitable interface such as Ethernet, ADSL or a wireless network interface.

It is preferred that communications to and from the transfer server 102 be conducted via the firewall 125 to prevent unauthorised access to, or malicious attacks upon, the transfer server 102.

The system 100 includes communication client program 103 which in a preferred embodiment is a computer program which is implemented with one or more central processing units 128, operatively coupled with storage medium 126 having instruction code 127 and a network interface 130.

Connection to the transfer server is facilitated via a participants communication client program instance.

Logical connectivity between two participants is depicted in FIG. 1A. Connectivity is available between participant 111 and the transfer server 102 for the sending of mail items and connectivity is available between transfer server 102 and the addressed mail recipient participant 112 for the collection of said mail item.

Logical connectivity between participants when sending advertising mail items is depicted in FIG. 1B. Connectivity is available between participant 111 and the transfer server 102 for the sending of advertising mail items and connectivity is available between participants 112, 113 and 114 and the transfer server 102 for the collection of said mail item. Assignment of the advertising mail item is conducted by reconciling participant advertising nominations with the "intended audience" selection of the sent advertising mail item. The "intended audience" selection is a category and geographic location selection.

Logical connectivity between plurality of participants is facilitated via the transfer server 102, as depicted in FIG. 1C in a preferred embodiment of the invention.

All participants are able to send and receive mail items and advertising mail items.

The purpose of the mail system is to provide one or more participants with a mail transfer service to send and receive mail items and advertising items in electronic form onymously, using a communications client program. A participant can send mail items to any other participant provided that the said participant has the street address of the intended participant recipient. It is a particular feature of the transfer system that participants nominate advertising interests and senders of advertising mail items nominate "intended audience" so that reconciliation of advertising mail receivers can be carried out at the transfer server 102. Participant information including advertising nominations are not shared with third parties.

Figure 1E:
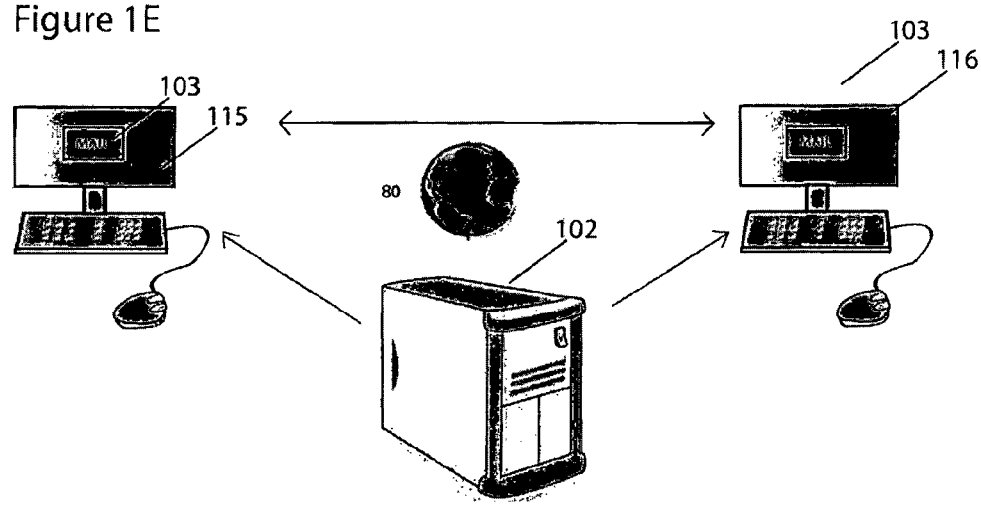
FIG. 1E is a schematic diagram of participants conducting real-time audio/video communications in accordance with a preferred embodiment of the invention.

FIG. 1E depicts a real-time audio/video connection between two participants in accordance with the invention. A connection is established between participants 115 and 116 through the installed communications client program. Participant 115 queries the transfer server 102 for participant 116s availability and IP address. The transfer server 102 determines whether participant 116 is indeed a participant and if so whether participant 116 is available for communications by querying participant 116 with the last known IP address. If participant is available for communications, the relevant IP address is transmitted to the initiating participant 115. Participant 115 can then establish an audio/video communication channel with participant 116.

With reference to FIG. 2, a flowchart illustrating essential steps of the onymous mail transfer service according to a preferred embodiment of the invention, participation is initiated at step 201 when the prospective participant installs a communication client program. At step 202, the prospective participant makes an application to register with the transfer server. The process is described in detail below with reference to FIGS. 3, 4 and 5A. However in summary, the application includes applicants name, street address as well as other contact information. The application also includes an "activation key" which is a hash generated by the installed communication client program 103 using a device specific identity (e.g. MAC address on PCs or IMEI number on mobile devices). The "activation key" is generated and transferred to the transfer server unbeknownst to the participant. At step 203 the participant name and street address is verified by sending the "activation key" via the postal services to the prospective participants street address and then having the prospective participant enter the "activation key" through the communication client program 103 through to the transfer server 102. The identity validation process 203 is described in detail below with reference to FIGS. 5A and 5B.

Once the identity validation carried out in step 203 is successfully processed, participant advertising nominations are obtained at step 204. Advertising nominations are areas of interest that the participant may wish to receive advertising mail items about. For example, live music acts within a 5 km radius of the participant street address. An essential benefit of the invention is that participants can send/receive location specific advertisements cost-effectively because of the correlation provided by the mail transfer service.

Participants may change their advertising nominations at any given time.

At step 205 participant account is created. The process is described in detail below with reference to FIG. 6. As part of the account creation process, public key infrastructure components such as a key pair and digital certificate are generated at the transfer server 102 at step 206 and transferred to the participants mail access client program in order to persist the validated identity of the authenticated participant. Participant PKI components are managed by the transfer server 102 and the communication client program 103, participants are not actively involved in the process. This automation is for the ease and benefit of participants. A copy of participant private key may be stored in an external database as back up and may be requested by the account holder participant or relevant law enforcement authorities.

At step 207, the participant creates mail items addressed to a particular participant. For example a participant utility company may create, address and send a monthly bill to a participant customer in electronic form. Advertising mail items with "intended audience" specifications can also be created according to a preferred embodiment of the invention. For example, a participant may send out an invitation to nearby resident book lovers to form a book club. Addressed mail items include a message digest notification request to establish non-repudiation claim. However the request for a message digest notification may be omitted by the mail sender.

In accordance with the invention, a mail item is any item of traditional post mail converted to electronic form in any file format inclusive of but not limited to, plain text, PDF, XML for text and/or GIF and JPEG for image. Additionally in accordance with the invention, a mail item is an audio or video message in electronic form in any file format including but not limited to, mop, wma or au for audio and swf, wmv and mpg for video.

A secure connection is established at step 208 with the transfer server 102 for the purposes of forwarding the mail item(s) created in step 207. A "client-authenticated SSL connection" is an exemplary implementation of a secure connection according to a preferred embodiment of the invention. Additionally, the "activation key" is requested by the transfer server 102 when establishing a secure connection with the transfer server 102 as an additional safety measure to verify the device making the request. Mail items are encrypted using a combination of hashing, data compression, symmetric-key cryptography and public-key cryptography. Step 208 is described in detail below with reference to FIG. 8A.

At step 209, the sent mail items are verified for address validity. If the addressee of the said mail item is not a participant of the onymous mail transfer service, a notice is sent back to the mail sender. Additionally, access is provided for government organisations to send mail items to all participants in any area. Authority levels are described in detail below with reference to FIG. 6. Participant individuals and businesses are bound by participant advertising nominations as described in step 204 and cannot send mail items to all participants.

Sent Mail items are sorted by the transfer server 102 and stored on recipient(s) mail folders to be collected by the said recipients at step 210. Name and Street Address is used as the default addressing regime as opposed to email address, IP address or system specific unique identifier. Advertising mail items are addressed by category and geographic locality and reconciliation with participant specific street addresses is carried at step 210. Advertising categorisation and the provision of the service is aimed at exposing participants to various products, services, events and functions that may spark a potential interest.

At step 211, the participant recipient(s) of the sent mail item establishes a secure connection to the transfer server 102 as described in step 208 above and the sent mail item is transferred to the recipient(s) communications client program. Participants may connect to the transfer server periodically to check mail or they may establish a persistent connection to the transfer server 102 and query the server for new mail items intermittently according to a preferred embodiment of the invention.

The onymous mail transfer system additionally provides for a massage digest notification to be transmitted at step 212. The message digest notification (MDN) is requested at step 207 when mail items are sent and the generated MDN is deposited at the transfer server in the mail senders folder for collection by the said sender.

While the foregoing description with reference to FIG. 1A, 1B, 1D and FIG. 2 illustrate the operation of system 100, transfer server 102 and mail access client program 102 from the perspective of a single participant, it will be appreciated that this is exemplary only of the general operation of system 100, the transfer server 102 and the mail access client program, which provide a service for onymous transfer of mail items to and from a plurality of participants as illustrated in FIG. 1C.

FIG. 3 is a flowchart 300 of an exemplary mail client installation, application and account creation process according to a preferred embodiment of the invention. At step 301, a potential participant installs a communications client program and at step 202 submits an application for registration with the transfer server. The application structure is described in detail below with reference to FIG. 4. At step 302, the accounts database is queried for existing accounts and cross-referenced with the applicant details to determine whether an account already exists. As is illustrated at step 304, if an account already exists, an account exist notification 305 is generated and the process is terminated at step 306.

Given that the application is for a new account, registration initialisation is carried out at step 307, which is described in detail below with reference to FIG. 4. Identity authentication is of significant importance in a preferred embodiment of the invention. Primary identity authentication is carried out at step 308 by sending the "activation key" by conventional post services to the applicant and having the said applicant input the "activation key" with an activation request via the communications client program to the transfer server. The applicants access to the post address confirms the name and street address of the said applicant with the minimum of inconvenience to the applicant. Failure of the identification process leads to a failure notification at step 309 and process termination at step 306. Successful identity authentication leads to the account creation process at step 312. The primary identity authentication method is detailed below with reference to FIG. 5A.

Secondary and tertiary authentication carried out at steps 310 and 311 are progressively stringent measures to validate the identity of a participant. Secondary and tertiary authentication methods are detailed below with reference to FIGS. 5B and 5C respectively. These additional levels of authentication makes the onymous mail transfer service, according to the invention, more scalable and provides different degrees of authentication rigour for specific activities. For example, it is plausible to envisage an electronic voting system implemented via the onymous mail transfer service, where tertiary authentication is mandated by the respective government.

The account creation at step 312 follows the successful primary identity authentication process at step 308, in which an account is created as described below in detail with reference to FIG. 6, and persisted in the accounts database at 303.

At step 313, private key and corresponding signed digital certificate is transferred to the applicants communications client program using the secure connection established to activate the user account. Alternatively, the key pair and the digital certificate may be generated at the communications client program and the digital certificate forwarded to the transfer server to be signed by the transfer server as the certificate authority. According to a preferred embodiment of the invention, the transfer server performs the functions of a conventional certificate authority by issuing signed digital certificates to participants in the onymous mail transfer system. In addition to traditional functions carried out by a certificate authority, the transfer server also generates the key pair and forward the private key to the applicant in step 313.

According to a preferred embodiment of the invention, participants communications client program acts as the gateway to onymous and secure communications via the Internet. Apart from sending and receiving discrete mail items, the communications client program is used as the point of authentication for real-time, onymous and secure audio and video communications.

Figure 4:
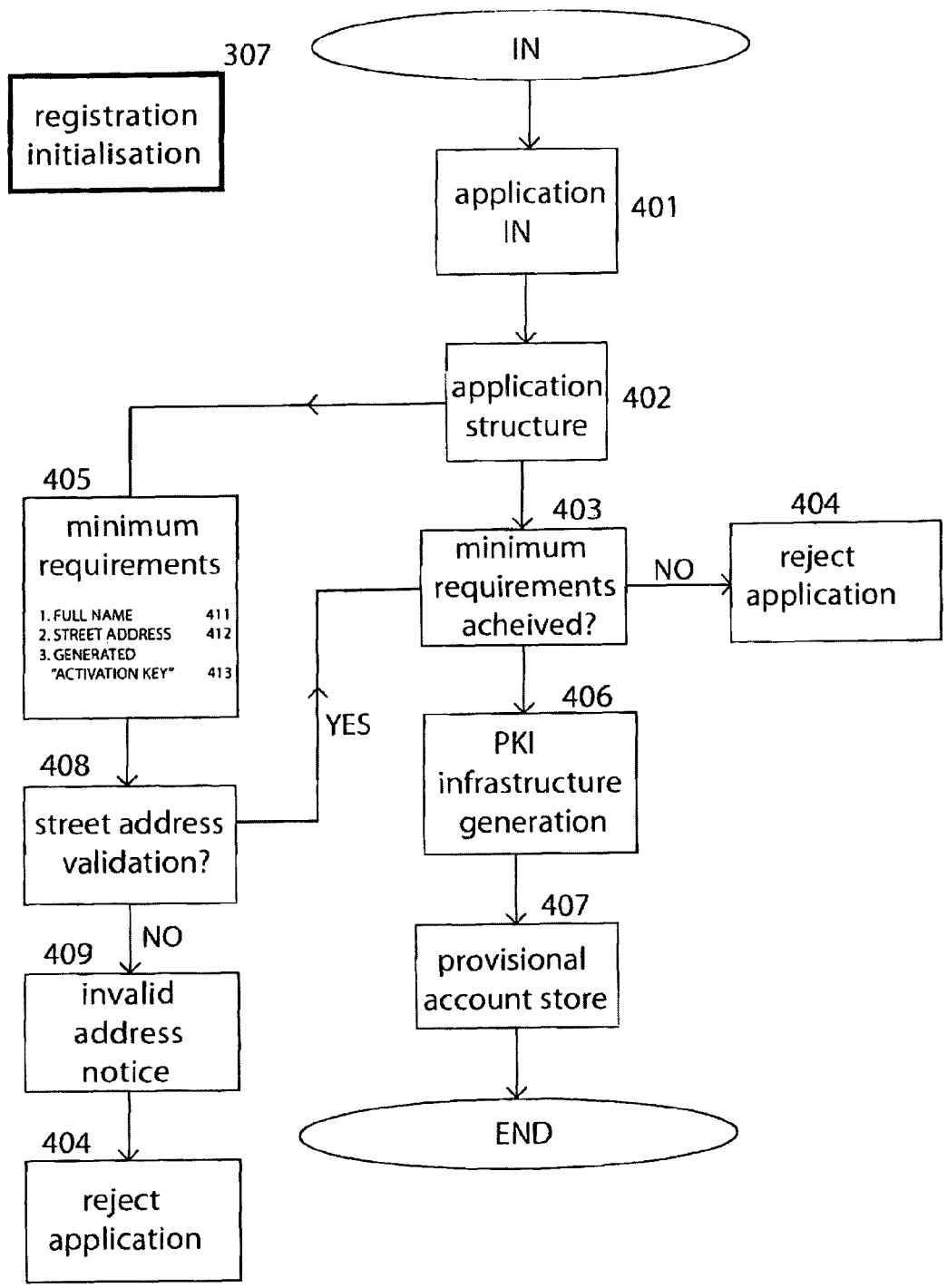
FIG. 4 is a flowchart of an exemplary account registration initialisation process according to an embodiment of the invention.

FIG. 4 is a flowchart showing further details of a preferred embodiment of the registration initialisation process 307. According to the embodiment, the application is submitted through the installed mail access client program via the internet. The application must meet the minimum requirements 405, which must include the applicants full name 411, street address 412 and generated "activation key" 413. The "activation key" is generated by the mail access client program using a hardware specific identifier such as the MAC address or IMEI number on mobile devises and a suitable cryptographic algorithm. The purpose of the "activation key" is to restrict unauthorised mail client program copy installations as well as to identify specific instance of a mail client program independent of the associated digital certificate so as to corroborate the devise that is used to access the transfer server with the associated digital certificate. In the unlikely event that the participants mail access device (eg PC or PDA) is compromised and digital certificate stolen, the attacker still needs to generate the "activation key" to establish a connection with the transfer server. The "activation key" is generated and transferred unbeknownst to the applicant.

At step 408, the provided street address is validated against existing street addresses available in a specific region through third party providers and if the address is invalid, invalid address notice is generated and the application rejected at step 404. Once the minimum requirements are met at step 403, a key pair and the corresponding digital certificate is generated at step 406 and stored in a provisional account store at step 407.

Figure 5A:
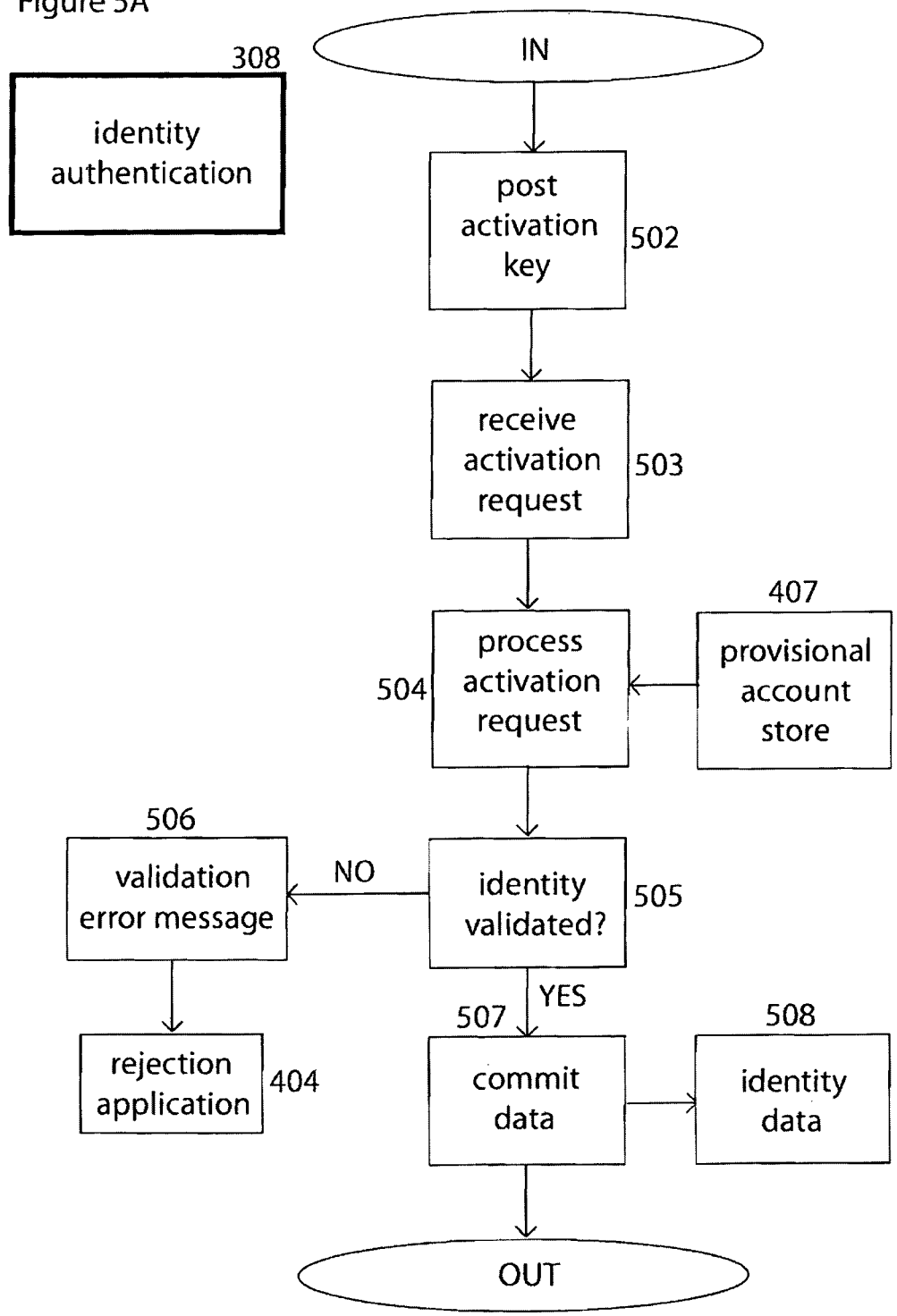
FIG. 5A is a flowchart an exemplary primary method of identity authentication according to a preferred embodiment of the invention.

FIG. 5A is a flowchart showing further details of a preferred embodiment of the primary identity authentication process 308. According to the embodiment, the "activation key" received in with the application is sent to the applicant via the postal services at step 502. At step 503 the applicant inputs the received "activation key" via the mail access client program through to the transfer server in the activation request confirming that the applicant has access to the physical mail box and therefore by association bears the name and resides at the street address.

At step 504, the information received with the activation request is compared against entries in the provisional account store and if the information does not corroborate at step 505 a validation error message is generated at step 506 and application rejected at step 404. Successful primary identity authentication at step 504 leads to persisting the identity data at step 508.

Figure 5B:
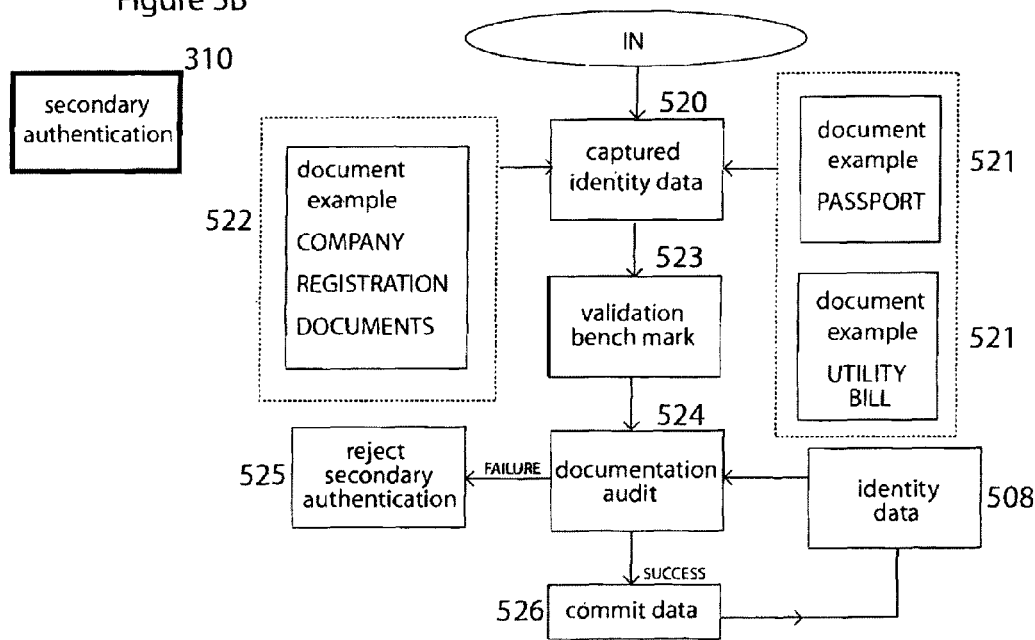
FIG. 5B is a flowchart of a secondary method of identity authentication according to a referred embodiment of the invention.

FIG. 5B is a flowchart showing further details of a preferred embodiment of the secondary identity authentication process 310. According to the embodiment, captured identity data is presented to the transfer server via the mail access client program at step 520. By way of document example, passport 521 and utility bill 521 is shown for individuals, and company registration documents 522 for companies. The examples are in no way limiting the scope of identity verification but rather an example to illustrate the process of secondary authentication. The validation benchmark at step 523 provides the specific document requirements and this may vary from region to region and country to country. The validation benchmark is some appropriate standard against which the persuasiveness of the proof of identity data or documentation may be measured, so as to provide a formal and uniform standard of proof of identity.

At step 524, a document audit is carried out either manually or electronically to establish the authenticity of the documents and the information they contain, comparing the received information with perssited identity data at 508. Failure of the audit process results in rejecting the secondary authentication request in step 525. Successful audit of the captured identity data leads to step 526, where the secondary authentication data is persisted as identity data.

Figure 5C:
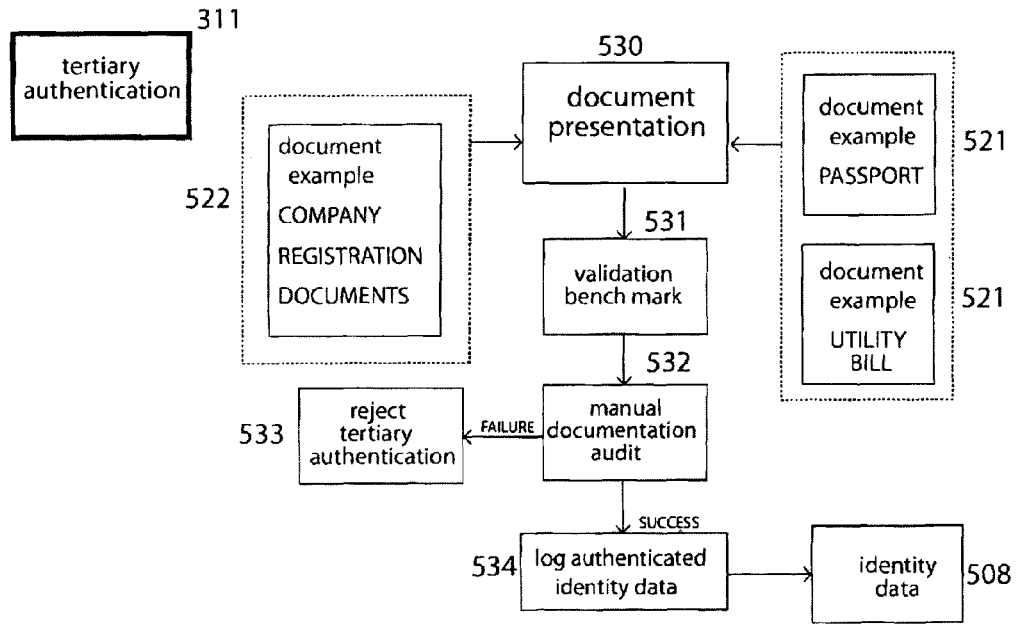
FIG. 5C is a flowchart of a tertiary method of identity authentication according to a preferred embodiment of the invention.

FIG. 5C is a flowchart showing further details of a preferred embodiment of the tertiary identity authentication process 311. According to the embodiment, original authentication documents are presented at a nominated center or outlet. (eg the post office) By way of document example, passport 521 and utility bill 521 is shown for individuals, and company registration documents 522 for companies. The examples are in no way limiting the scope of identity verification but rather an example to illustrate the process of tertiary authentication. The validation benchmark at step 531 provides the specific document requirements and this may vary from region to region and country to country. The validation benchmark is some appropriate standard against which the persuasiveness of the proof of identity data or documentation may be measured, so as to provide a formal and uniform standard of proof of identity.

At step 532, a manual document audit is carried out by the outlet representative and successful audit leads to step 534, where the authenticated identification data is logged to the transfer server through a secure connection, to be persisted as identity data. Failure of documentation audit leads to step 533, where the tertiary authentication is rejected.

Figure 6:
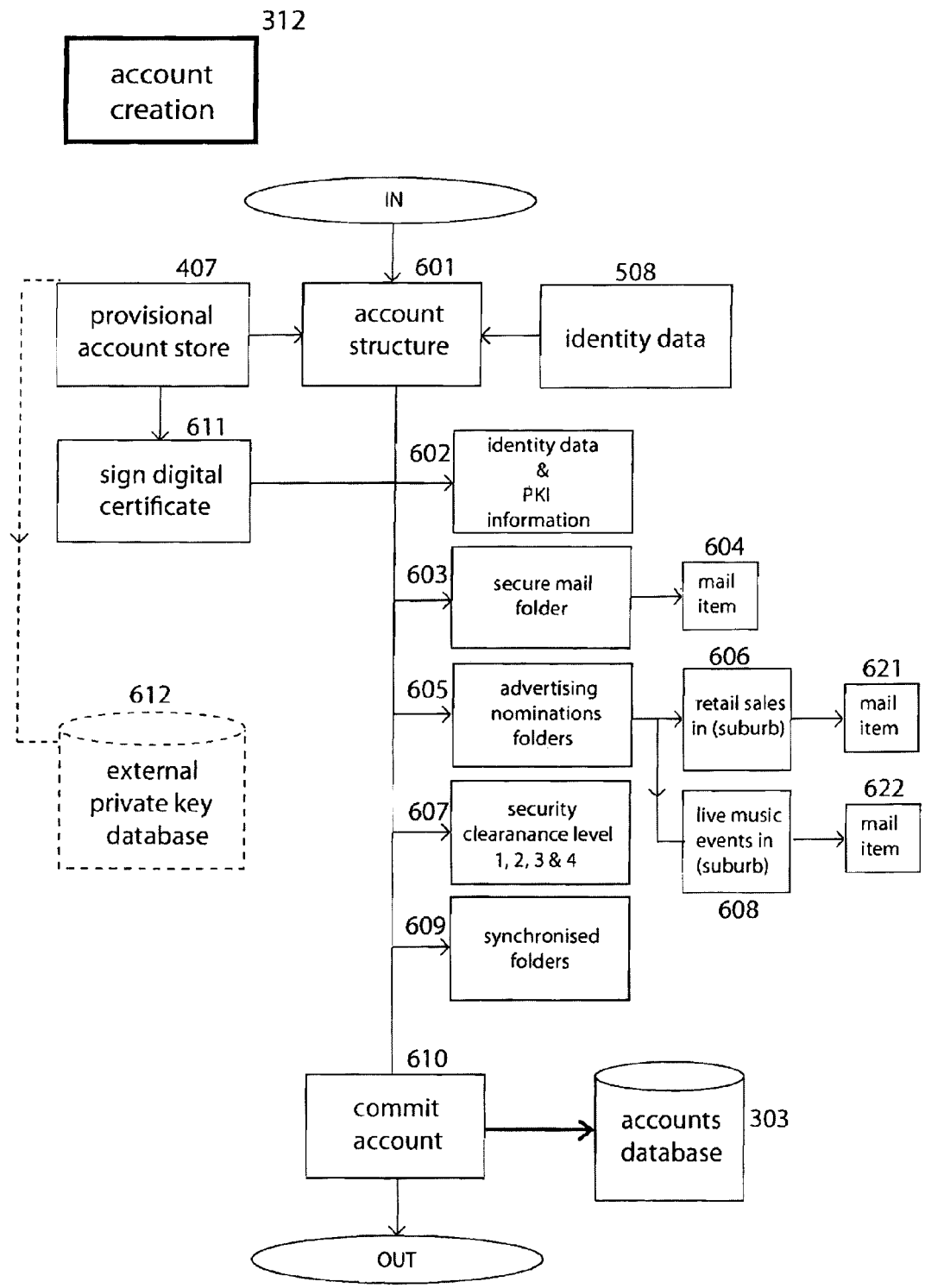
FIG. 6 is a flowchart of the account creation process according to a preferred embodiment of the invention.

FIG. 6 is a flowchart showing further details of a preferred embodiment of the account creation process 312. According to the invention, inputs to the account creation process 312 are data from the provisional account store 407 and data from the identity data store 508. The account framework incorporates division of functionality and employs different data structures to implement the required functionality. At step 611 the generated digital certificate is signed by the transfer server acting as the certificate authority and stored along with other "PKI" data at step 602 and a copy to be transferred to the participant following the account creation process as described above in step 313 with reference to FIG. 3. Additionally a copy of the private key is persisted in an external database 612, for situations where the private key is lost or destroyed due to some unforseen reason and needs to be replaced. Optionally participants may request their private key to be destroyed after successful completion of step 313 with reference to FIG. 3 as described above.

At step 602, identity data is collated with PKI information to form the identification description. Without limitation, the identification description includes participant name, street address, "activation key" and participants public-key.

Secondary and tertiary authentications are persisted through security clearance levels as depicted in step 607. Without limitation, clearance levels 1, 2 and 3 correspond with primary, secondary and tertiary levels of authentication. An additional level 4 clearance is provided for various government organisations and law enforcement agencies to communicate with participants without restrictions.

At step 603, secure mail folder is created where all addressed mail items are deposited, awaiting collection by the account holder participant. The addressed mail items may additionally be encrypted before storage with the account holder participants public-key. Advertising nominations folders are generated at step 605 to store advertising mail items received by the account holder participant. A clear distinction is enforced by the onymous mail transfer service to separate addressed mail items from advertising mail items at the mail creation process where the mail sender is explicitly required to declare advertisements. Non-compliance may result in restrictions being imposed upon the offending participants. Advertising nominations may be changed any time according to the wishes of the account holder participant.

Additionally a synchronised folder is created at step 609 to facilitate files and folder storing on the transfer server as an online back-up storage for the account holder participant. The participant may wish to store important documents such as receipts, resumes, photocopies of important identity documents and so forth.

At step 610, the generated account structure is persisted to the accounts database 303.

Figure 7A:
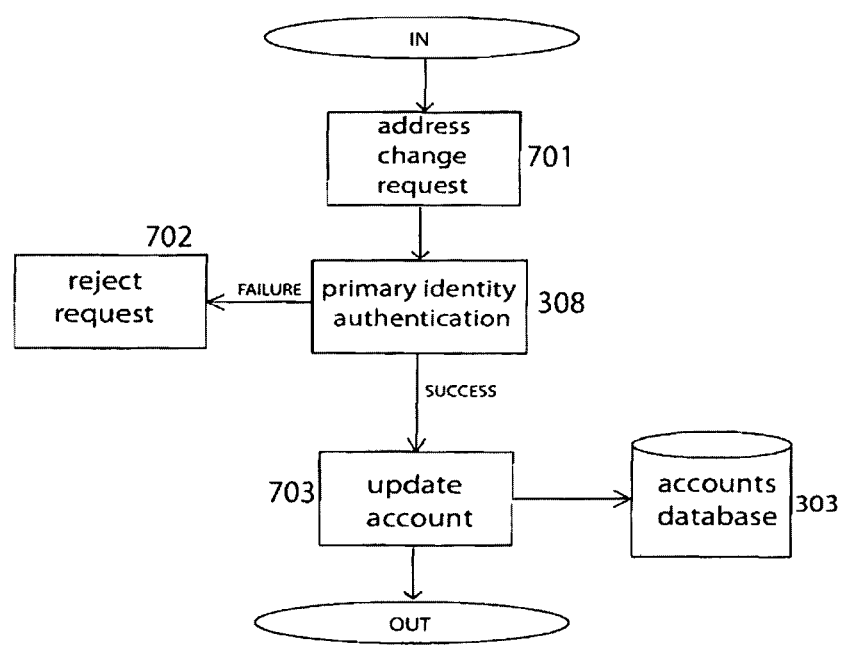
FIG. 7A is a flowchart of an address change process according to a preferred embodiment of the invention.

FIG. 7A is a flowchart showing details of a preferred embodiment of the address change request process 701. When participants change their permanent address, an accompanying address change request is to be lodged with the transfer server via the mail access client program. At step 308, primary identity authentication is carried out as described above with reference to FIG. 5A to verify the new address proposed by the participant. Failure of the identity authentication process results in a request rejection at step 702. Following successful identity authentication the accounts database 303 is updated at step 703.

Figure 7B:
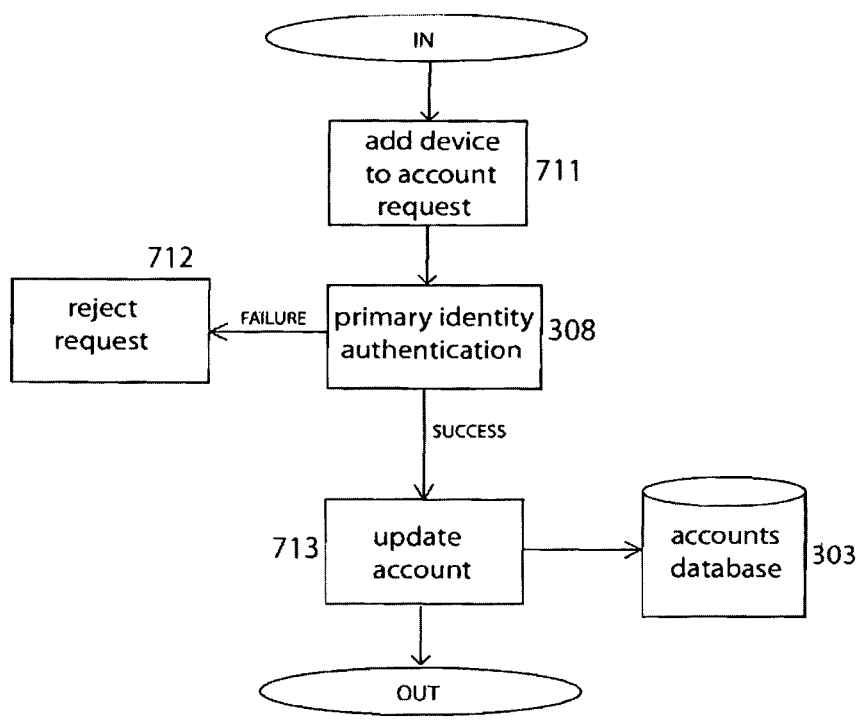
FIG. 7B is a flowchart of a device add process according to a preferred embodiment of the invention.

FIG. 7B is a flowchart showing details of a preferred embodiment of the add device to account request process 711. If participants wish to add an additional access device with a mail access client installed, a request is send through the mail access client program to the transfer server. At step 308, primary identity authentication is carried out as described above with reference to FIG. 5A to verify that the participant has access to the proposed device as well as the street address. Following successful identity authentication the accounts database 303 is updated at step 713.

Figure 8A:
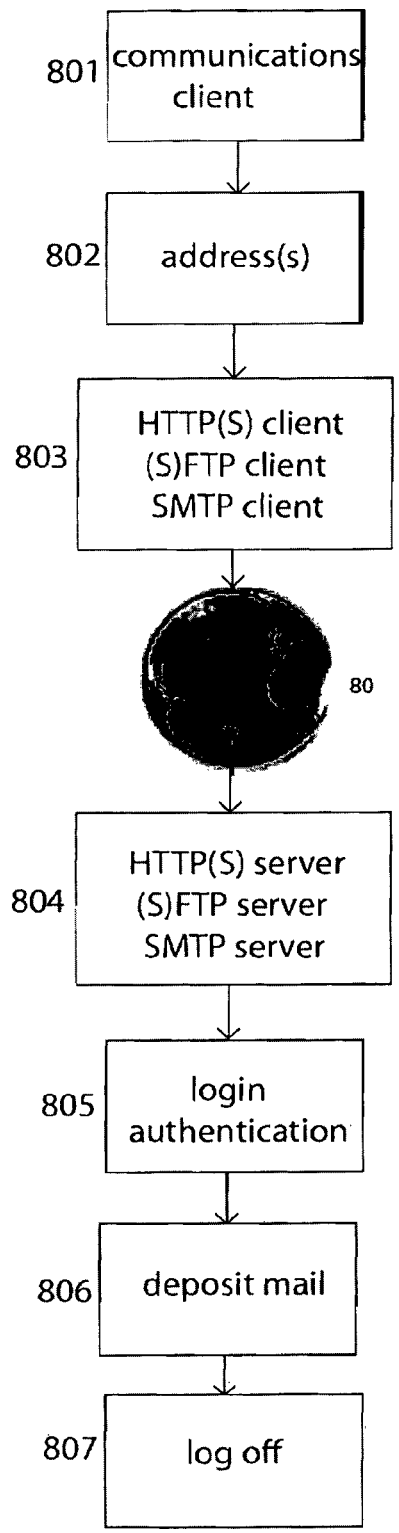
FIG. 8A is a flowchart of the mail sending process according to a preferred embodiment of the invention.

FIG. 8A is a flowchart showing details of the mail sending process according to a preferred embodiment of the invention. At step 802 mail items are created and at steps between 803 and 804, a secure Internet protocol (IP) connection is established with the transfer server using, without limitation, HTTP(S), (S)FTP or secure SMTP protocols. The mail access client program initiates the connection. Two-way client-authenticated SSL connection is used as a preferred method of secure connection. At step 805 login authentication is carried out by the transfer server using the participant digital certificate and the device specific "activation key". It must be noted that steps 802-805 are interconnected steps that enable secure sending of mail items. Mail items are encrypted using a combination of hashing, data compression, symmetric-key cryptography and public-key cryptography. Additional methods that are evident to a person skilled in the relevant art may be used. At step 806, the transfer server processes the sent mail item(s) and deposits them in the relevant folders of the intended recipient(s) and the mail sender logs off at step 807.

Figure 8B:
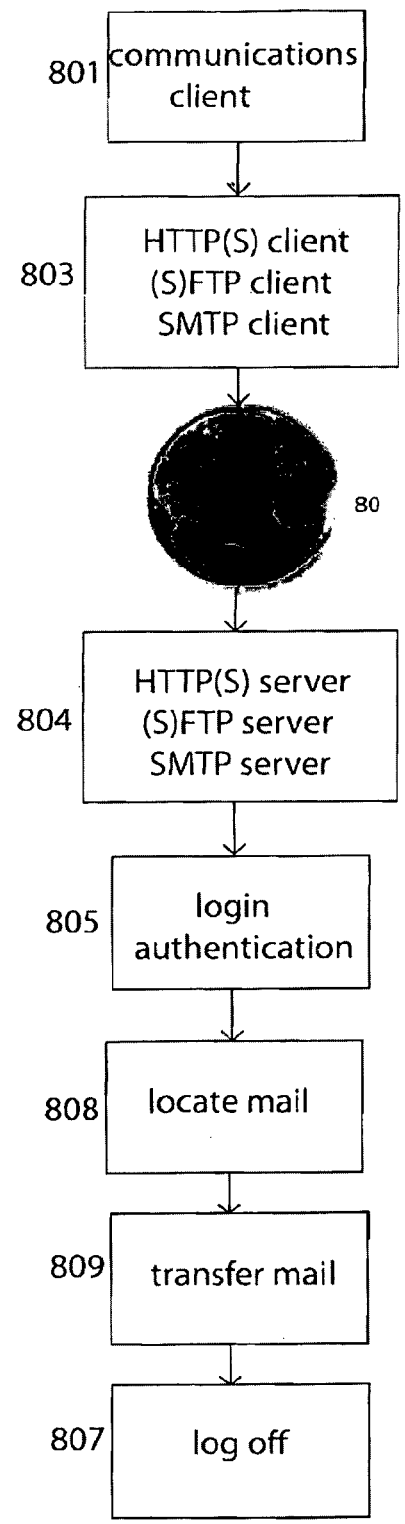
FIG. 8B is a flowchart of the mail receiving process according to a preferred embodiment of the invention.

FIG. 8B is a flowchart showing details of the mail collection process according to a preferred embodiment of the invention. Steps 803-805 are as described above with reference to FIG. 8A. At step 808, the transfer server obtains new mail items from the participants relevant folders and at step 809 mail items are transferred to the participants mail access client program where the mail items are processed and decrypted and a message digest notification transferred back to the transfer server if required.

Figure 8C:
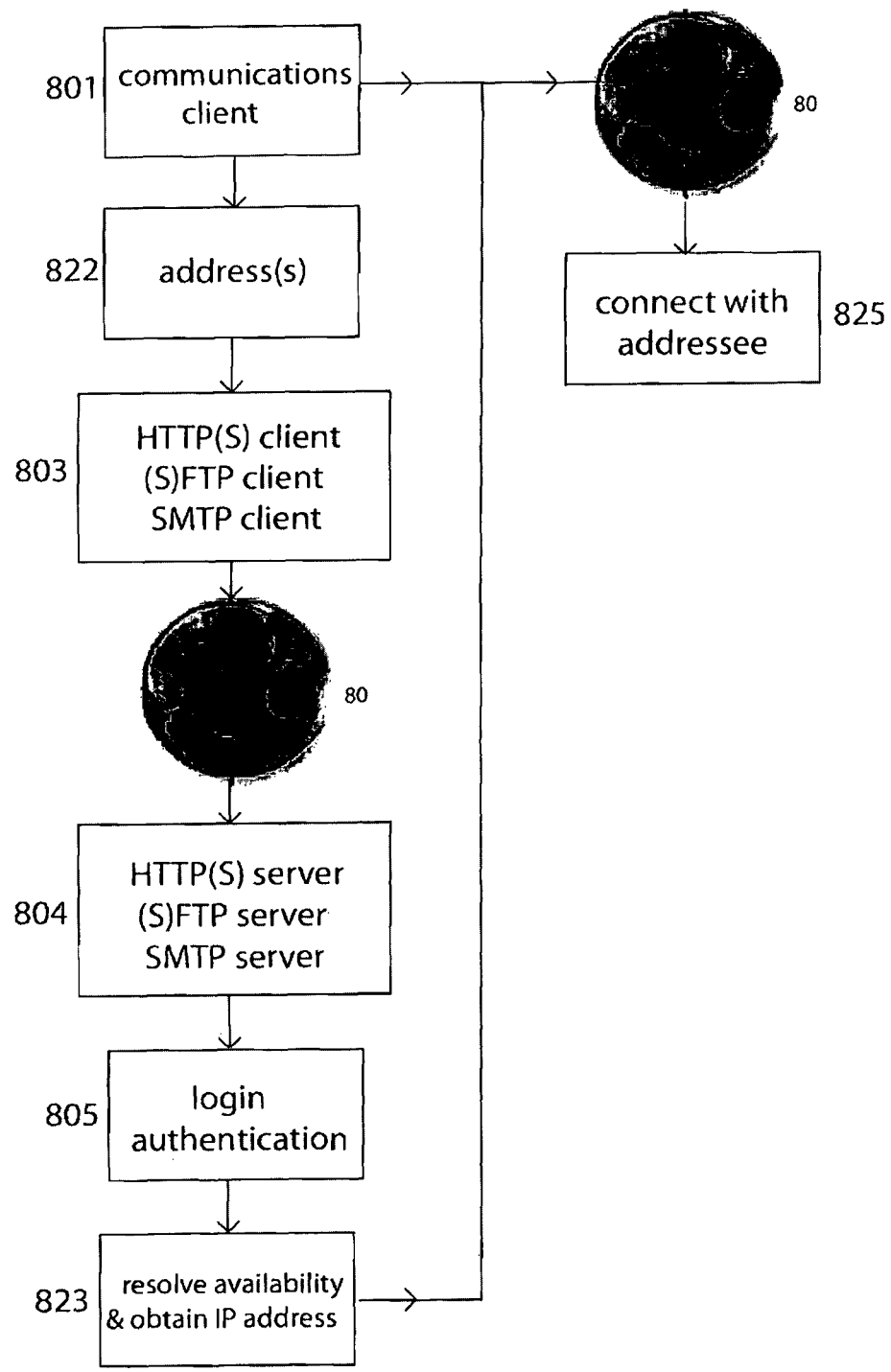
FIG. 8C is a flowchart of establishing and conducting audio or video communications according to a preferred embodiment of the invention.

The real-time audio and video communications process is illustrated in FIG. 8C, in accordance with a preferred embodiment of the invention. The communications client program makes a connection request with an addressee 822. Steps 803-805 are described above in detail with reference to FIG. 8A. At step 823, the transfer server queries the accounts database to verify that the addressee is indeed a participant and if so queries the addressee 822 using the last known IP address for availability. Upon success, the addressees IP address is transferred to the initiator client. At step 825 a secure connection is established for real-time audio and video communications using methods and protocols apparent to a person skilled in the relevant art.

The invention is not to be considered as any way limited by the foregoing descriptions of preferred embodiments, which are provided by way of example, but rather the scope of the invention is defined by the claims appended.

It will be understood to persons skilled in the art of the invention that many modifications may be made without departing from the spirit and scope of the invention, in particular it will be apparent that certain features of embodiments of the invention can be employed to form further embodiments.

It is to be understood that any reference to prior art made herein does not constitute an admission that the prior art formed or forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of transmitting content of a postal mail item from a first user to a second user, the method comprising the steps of:
   a first user device establishing a secure channel of communication with a server in communication with a database storing a plurality of names and postal addresses, each name and postal address associated with an activation key and a postal mail folder, the secure channel of communication established by:
   (i) the first user device generating a first user device identification key based on an identifier of the first user device;
   (ii) the first user device transmitting to the server an activation key based on the first user device identification key, the activation key corresponding to the activation key associated with one of the names and postal addresses stored in the database; and
   (iii) the server receiving the activation key transmitted from the first user device;
   the first user device generating an electronic copy of content of a postal mail item bearing the name and postal address of the second user;
   the first user device transmitting the electronic copy to the server via the secure channel of communication;
   the server locating from the plurality of names and postal addresses stored in the database a name and postal address corresponding to the name and postal address of the second user transmitted from the first user device; and
   the server storing the electronic copy in the postal mail folder associated with the located name and postal address, for collection by the second user.

2. A method as claimed in claim 1, further comprising the steps of:
   the first user device encrypting the electronic copy using a private key before transmitting the electronic copy encrypted by the first user device to the server; and
   in response to the server receiving the electronic copy transmitted from the first user device,
      the server decrypting the electronic copy transmitted from the first user device using a public key corresponding to the private key; and
      the server encrypting the electronic copy decrypted by the server using a public key associated with the located second user account before storing the electronic copy encrypted by the server in the second postal mail folder.

3. A method as claimed in claim 1, further comprising:
   a second user device establishing a secure channel of communication with the server; and
   the server transmitting the electronic copy stored in the database to the second user device.

4. A method as claimed in claim 1, wherein the postal address of the user is a street address of the user.

5. One or more non-transitory machine-readable storage media storing computer program code which when executed causes the following operations to be performed:
   a first user device establishing a secure channel of communication with a server in communication with a database storing a plurality of names and postal addresses, each name and postal address associated with an activation key and a postal mail folder, the secure channel of communication established by:
   (i) the first user device generating a first user device identification key based on an identifier of the first user device;
   (ii) the first user device transmitting to the server an activation key based on the first user device identification key, the activation key corresponding to the activation key associated with one of the names and postal addresses stored in the database; and
   (iii) the server receiving the activation key transmitted from the first user device;
   the first user device generating an electronic copy of content of a postal mail item bearing the name and postal address of the second user;
   the first user device transmitting the electronic copy to the server via the secure channel of communication;
   the server locating from the plurality of names and postal addresses stored in the database a name and postal address corresponding to the name and postal address of the second user transmitted from the first user device; and
   the server storing the electronic copy in the postal mail folder associated with the located name and postal address, for collection by the second user.

6. A server comprising:
   one or more processors; and
   one or more non-transitory machine-readable storage media storing computer program code which when executed by one or more processors causes the one or more processors to perform operations comprising:
   a first user device establishing a secure channel of communication with a server in communication with a database storing a plurality of names and postal addresses, each name and postal address associated with an activation key and a postal mail folder, the secure channel of communication established by:
   (i) the first user device generating a first user device identification key based on an identifier of the first user device;
   (ii) the first user device transmitting to the server an activation key based on the first user device identification key, the activation key corresponding to the activation key associated with one of the names and postal addresses stored in the database; and
   (iii) the server receiving the activation key transmitted from the first user device;
   the first user device generating an electronic copy of content of a postal mail item bearing the name and postal address of the second user;
   the first user device transmitting the electronic copy to the server via the secure channel of communication;
   the server locating from the plurality of names and postal addresses stored in the database a name and postal address corresponding to the name and postal address of the second user transmitted from the first user device; and
   the server storing the electronic copy in the postal mail folder associated with the located name and postal address, for collection by the second user.

7. A method of enabling audio or video communication between a first user and a second user, the method comprising the steps of:
   a first user device establishing a secure channel of communication with a server in communication with a database storing a plurality of names and postal addresses, each name and postal address associated with an activation key and an Internet Protocol (IP) address, the secure channel of communication established by:
- (i) the first user device generating a first user device identification key based on an identifier of the first user device;
- (ii) the first user device transmitting to the server an activation key based on the first user device identification key, the activation key corresponding to the activation key associated with one of the names and postal addresses stored in the database; and
- (iii) the server receiving the activation key from the first user device;

the first user device transmitting to the server a request for a communication channel with the second user, the request comprising the name and address of the second user;

the server locating from the plurality of names and postal addresses stored in the database a name and postal address corresponding to the name and postal address of the second user transmitted from the first user device; and the server enabling audio or video communication between the first user and the second user, by transmitting to the first user device the IP address associated with the located name and postal address.

8. A method as claimed in claim 7, further comprising the server determining that the second user is available for communications.

9. A method as claimed in claim 7, wherein the postal address of the user is a street address of the user.

10. A method as claimed in claim 7, wherein a public key is associated with each name and postal address stored in the database, and the public key associated with the located name and postal address is transmitted along with the IP address associated with the located name and postal address to the first user device.

11. One or more non-transitory machine-readable storage media storing computer program code which when executed causes the following operations to be performed:
- a first user device establishing a secure channel of communication with a server in communication with a database storing a plurality of names and postal addresses, each name and postal address associated with an activation key and an Internet Protocol (IP) address, the secure channel of communication established by:
  - (i) the first user device generating a first user device identification key based on an identifier of the first user device;
  - (ii) the first user device transmitting to the server an activation key based on the first user device identification key, the activation key corresponding to the activation key associated with one of the names and postal addresses stored in the database; and
  - (iii) the server receiving the activation key from the first user device;
- the first user device transmitting to the server a request for a communication channel with the second user, the request comprising the name and address of the second user;
- the server locating from the plurality of names and postal addresses stored in the database a name and postal address corresponding to the name and postal address of the second user transmitted from the first user device; and
- the server enabling audio or video communication between the first user and the second user, by transmitting to the first user device the IP address associated with the located name and postal address.

12. A server comprising:

one or more processors; and one or more non-transitory machine-readable storage media storing computer program code which when executed by one or more processors causes the one or more processors to perform operations comprising:
- a first user device establishing a secure channel of communication with a server in communication with a database storing a plurality of names and postal addresses, each name and postal address associated with an activation key and an Internet Protocol (IP) address, the secure channel of communication established by:
  - (i) the first user device generating a first user device identification key based on an identifier of the first user device;
  - (ii) the first user device transmitting to the server an activation key based on the first user device identification key, the activation key corresponding to the activation key associated with one of the names and postal addresses stored in the database; and
  - (iii) the server receiving the activation key from the first user device;
- the first user device transmitting to the server a request for a communication channel with the second user, the request comprising the name and address of the second user;
- the server locating from the plurality of names and postal addresses stored in the database a name and postal address corresponding to the name and postal address of the second user transmitted from the first user device; and
- the server enabling audio or video communication between the first user and the second user, by transmitting to the first user device the IP address associated with the located name and postal address.

* * * * *